Aug. 18, 1964  J. A. FRYE  3,144,876
SWING-TYPE CHECK VALVE
Filed April 25, 1962  2 Sheets-Sheet 1

INVENTOR.
JAMES A. FRYE
BY
ATTORNEYS

Aug. 18, 1964
J. A. FRYE
3,144,876
SWING-TYPE CHECK VALVE
Filed April 25, 1962
2 Sheets-Sheet 2
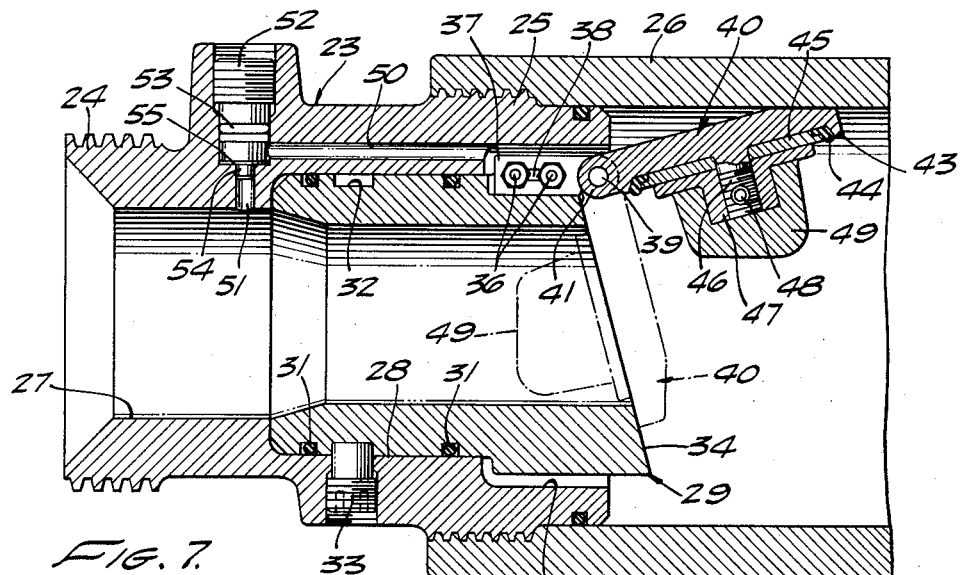
FIG. 7.
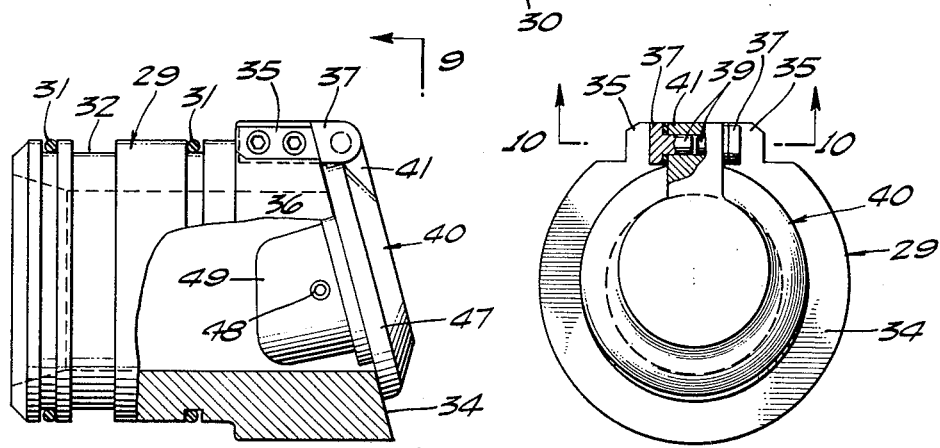
FIG. 8.
FIG. 9.
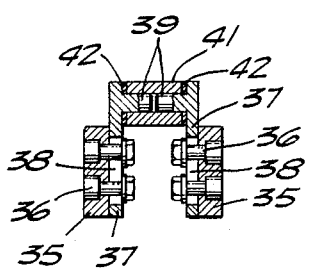
FIG. 10.
INVENTOR.
JAMES A. FRYE
BY
ATTORNEYS United States Patent Office 3,144,876
Patented Aug. 18, 1964

3,144,876
SWING-TYPE CHECK VALVE
James A. Frye, Duncan, Okla., assignor to Halliburton Company, Duncan, Okla., a corporation of Delaware
Filed Apr. 25, 1962, Ser. No. 190,175
4 Claims. (Cl. 137—454.5)

This invention relates to swing-type check valves, and included in the objects of this invention are:

First, to produce a swing-type check valve which is particularly adapted for installation in flow lines subjected to high volume flow of abrasive-laden fluids, and which incorporates novel means whereby the sealing surfaces are maintained out of the region of fluid flow to protect them from erosion.

Second, to provide a swing-type check valve which incorporates novel means to facilitate proper mating of the valve seats.

Third, to provide a swing-type check valve wherein the valve and its seat are arranged as a unit for removal and replacement, thereby to facilitate servicing of the valve.

Fourth, to provide a swing-type check valve, one embodiment of which incorporates a novel hinge means that is particularly adapted to withstand, without loosening, the vibratory stresses due to high-pressure, high-volume, fluid flow.

Fifth, to provide a swing-type check valve wherein the valve member and its seat may be readily rotated, with respect to the valve body, to the most favorable position for gravity operation of the valve member without breaking into the line containing the valve.

With the above and other objects in view, as may appear hereinafter, reference is directed to the accompanying drawings in which:

FIGURE 7 is a longitudinal, sectional view similar to FIGURE 1 showing a further modified form of the swing-type check valve with the valve shown in its open position;

FIGURE 8 is a side view of the valve sleeve and valve member shown in FIGURE 7 with the valve member in its closed position and a portion of the sleeve shown in section;

FIGURE 9 is an end view of the valve member and sleeve taken from 9—9 of FIGURE 8 with a portion broken away and in section;

FIGURE 10 is a fragmentary sectional view taken through 10—10 of FIGURE 9.

Figure 1:
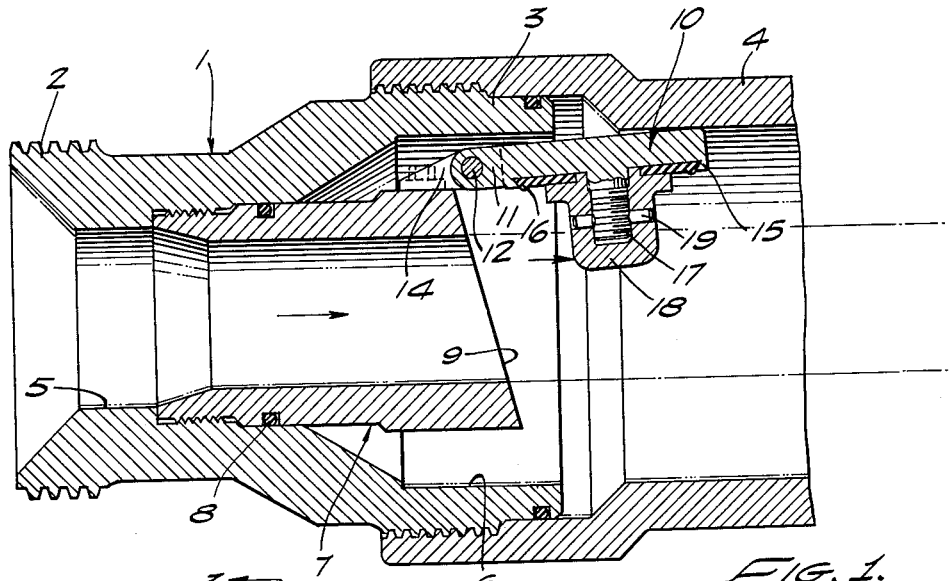
FIGURE 1 is a longitudinal, sectional view showing one form of the swing-type check valve in its open position, and showing fragmentarily a connecting fitting.
Figures 2, 3:
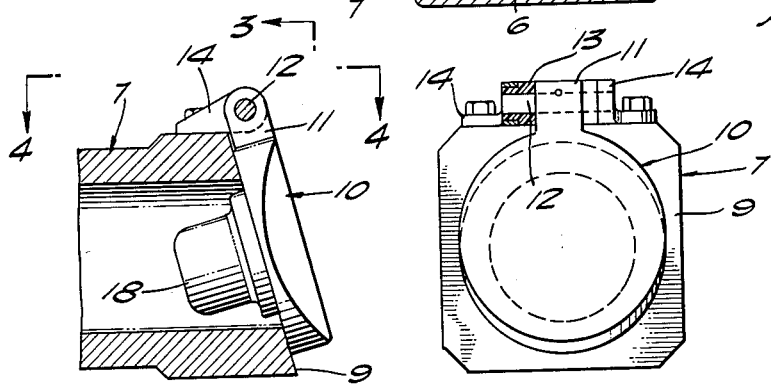
FIGURE 2 is a longitudinal, sectional view showing the valve member and valve sleeve removed from the valve body, the valve member being shown in its closed position.
FIGURE 3 is an end view of the valve member and sleeve taken from 3—3 of FIGURE 2.

Reference is first directed to FIGURES 1 through 4. The swing-type check valve includes a tubular valve body 1 having an externally screw-threaded downstream end 2 and an externally screw-threaded, enlarged, upstream end 3. The valve body 1 is adapted to be screw-threaded in a flow line, the upstream end 3 being shown as connected to a pipe section or fitting 4 indicated fragmentarily.

The valve body 1 is provided with a bore 5 which is counterbored at its upstream end 3 to form a valve chamber 6. The bore 5 adjacent the valve chamber 6 is internally screw-threaded to receive an inner sleeve 7 which projects into the counterbore or valve chamber 6. The extended end of the sleeve 7 projecting into the counterbore is essentially square in external configuration. In addition to the screw-threaded connection between the inner sleeve 7 and the walls of the bore 5, the inner sleeve is provided with a channel which receives an O-ring 8 so that the connection between the sleeve 7 and the bore 5 is sealed.

The upstream end of the inner sleeve 7 which projects into the valve chamber 6 forms a valve seat face 9, the axis of which forms an acute angle to the axis of the inner sleeve 7. The valve seat face 9 is adapted to be engaged by a valve member 10 in the form of a flat disk having a hinge lug 11 through which extends a hinge pin 12. The extremities of the hinge pin 12 extend into bushings 13, preferably formed of high strength plastic material, which in turn are supported by hinge brackets 14 secured to the side of the sleeve 7, which forms an obtuse angle with the plane of the valve seat face 9.

The side of the valve member 10 confronting the valve seat face 9 is provided with an undercut peripheral bead 15 which retains the outer margin of a sealing washer 16. Centered within the sealing washer 16 is a screw-threaded post 17 which receives a flanged cap 18, the flange of which retains the inner margin of the sealing washer 16. The cap 18 is locked in place on the post 17 by a retainer pin 19. The cap 18 is made of abrasion-resisting material, and not only serves to hold the sealing washer 16 in place but also serves to hold the valve in an open position essentially free of the flow of fluid issuing from the sleeve 7, as will be described in more detail hereinafter.

Figures 4, 5, 6:
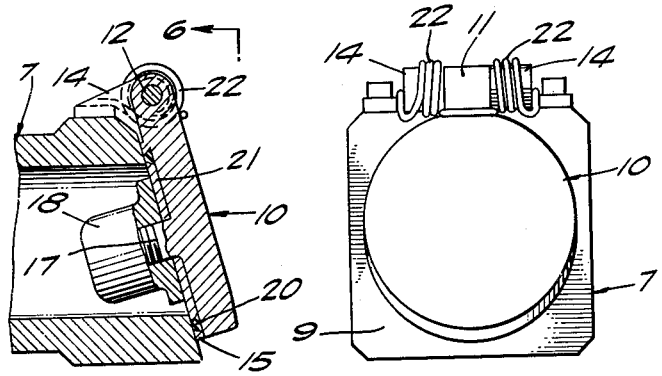
FIGURE 4 is a fragmentary side view taken from 4—4 of FIGURE 2.
FIGURE 5 is a fragmentary, longitudinal, sectional view similar to FIGURE 2 but showing a modified form of the valve.
FIGURE 6 is an elevational view taken from 6—6 of FIGURE 5.

Reference is directed to FIGURES 5 and 6. The construction here illustrated utilizes an O-ring seal 20 in lace of the sealing washer 16, and a retainer plate 21 forms with the bead 15 an undercut groove to retain the O-ring seal 20. It will thus be seen that the O-ring seal and the sealing washer 16 are interchangeable.

In some instances it is desirable to provide a spring to urge the valve toward its closed position. Such a spring is indicated by 22 in FIGURES 5 and 6.

Reference is now directed to FIGURES 7 through 10. The construction here illustrated includes a valve body 23 having an externally screw-threaded, downstream end 24 for connection to a pipe or fitting in a flow line, and an enlarged upstream end 25 which is also screw-threaded for connection to a pipe or fitting shown fragmentarily and designated 26. The valve body 23 is provided with a bore 27 which in turn is counterbored with a first counterbore 28 to receive an inner sleeve 29 and a second counterbore 30 to form a valve chamber.

The inner sleeve 29 is provided with a pair of O-ring seals 31 between which is formed a retainer groove 32 adapted to be engaged by externally accessible set screws 33 to lock the inner sleeve 29 in the counterbore 28 but permit circumferential adjustment. The downstream end of the inner sleeve which projects into the counterbore 30 is provided with a valve face 34, the axis of which defines an acute angle with the axis of the inner sleeve 29.

At the side of the sleeve which forms an obtuse angle with the face of the valve face 34 there is provided a pair of spaced axially extending ribs 35. Secured to the confronting sides of these ribs by bolts 36 is a pair of hinged brackets 37 having slots 38 so that the hinge brackets may be longitudinally adjusted with respect to the sleeve 29. Secured in each hinge bracket 37 is a hinge pin 39, which are disposed in coaxial abutting relation to each other.

A disk-shaped valve member 40 having a hinged lug 41 is provided with a bore through the hinge lug 41 which receives the aligned hinge pins 39. Washers 42 are preferably interposed between the ends of the hinge lug 41 and the hinge brackets 37. These washers are preferably formed of a high strength, low coefficient of friction, plastic material, such as Teflon, and serve to keep abrasive material from the hinge connection.

The side of the valve member 40 confronting the valve face 34 is provided with a peripheral bead 43 which retains the outer periphery of a seal ring 44, the inner periphery of which is secured by a retainer plate 45. Centered within the retainer plate 45 is a screw-threaded post 46 which receives a clamp nut 47 secured in place by a retainer pin 48. The clamp nut 47 and the extremity of the post 46 are encased in a nose cap 49 which may be held in place by the retainer pin 48. The nose cap is formed of material which is designed to withstand abrasion.

The various embodiments of the swing-type check valve hereinbefore described operate as follows:

The cap 18 and cap 49 function similarly. Under normal operation, in which fluid is flowing through the inner sleeve 29, the jet of fluid issuing from the sleeve is confined essentially to the center of the valve chamber and impinges on the nose cap to force the valve member to its extreme open position against a side of the valve chamber. The valve member is therefore held in the annular region outside the central region of high velocity flow. As a consequence, the sealing washer 16 or the seal rings 20 or 44 and the portions of the valve which retain the seal rings are maintained relatively free of contact with high velocity fluids, and the wear thereon is minimized.

The cap or nose piece which takes the brunt of the wear, due to erosion, may be made relatively thick and of erosion-resistant material, so that substantial wear may occur before the valve need be replaced.

Tests have indicated that under conditions of high pressure in flow lines for abrasive-laden fluids that the life of a valve constructed in accordance with the structure herein shown and described is increased some twenty times over a standard swing-type check valve.

When normal flow ceases or the valve is subjected to a backflow condition, the valve member readily pivots to its closed position, in which case the nose cap projects into the bore of the inner sleeve 7 or 29.

With particular reference to the construction shown in FIGURES 7 through 10, inclusive, by reason of the longitudinal adjustment afforded by the hinge brackets 37 and slots 38 the valve member may be adjusted so that the seal ring 44 conforms accurately to the valve face 34.

By reason of the O-ring seals 31 and groove 32 the inner sleeve may be circumferentially shifted with respect to the valve body to place the hinge bracket 37 of the valve member at the upper side of the flow line so that the valve member moves by gravity to its closed position.

Each of the embodiments of the invention illustrated lends itself to the provision of a bleed valve. Such a bleed valve is shown in connection with the construction illustrated in FIGURE 7. A by-pass bore 50 extends axially in the wall of the valve body 23 from the valve chamber 30, and is intersected by a radial port 51 extending from the bore 27. The port 51 is counterbored to receive a screw plug 52 which carries an O-ring seal 53 and is provided with a stem or extension 54 of reduced diameter which enters the port 51. The counterbore forms a shoulder to support a seal washer 55. When it is desired to equalize pressures across the closed valve member 40, the screw plug 52 is backed off to open the by-pass bore 50.

While particular embodiments of this invention have been shown and described, it is not intended to limit the same to the exact details of the constructions set forth, and it embraces such changes, modifications, and equivalents of the parts and their formation and arrangement as come within the purview of the appended claims.

I claim:

1. A swing-type check valve, comprising: a tubular valve body structure defining a throat having a valve seat at its upstream end and an enlarged valve chamber beyond the upstream end of said throat, whereby fluid flowing through said throat tends to form a jet stream in the center of said valve chamber and an annular region of lower velocity fluid around said jet stream; a valve member for said valve seat in said valve chamber, hinge means for said valve member having a pivotal axis in said annular region, said valve member being movable between a closed position engaging said valve seat and an open position within said annular region; and an element carried by said valve member projecting therefrom into said jet stream and constructed and arranged so that impingement thereon by the fluid flowing therein, when said valve member is in its open position, urges said valve member clear of said jet stream.

2. A swing-type check valve, comprising: a tubular valve body having an internally enlarged upstream end forming a valve chamber; an inner sleeve removably secured within said valve body and forming a throat, said inner sleeve extending into said valve chamber and forming at its extreme end a valve seat, said throat tending to confine high velocity flow of fluid issuing therefrom to the central area of said chamber and to establish therearound an annular region of relatively low velocities; a valve member for said valve seat; a hinge means at one side of said valve member and inner sleeve within said annular region for permitting movement of said valve member between a position closing said throat and an open position within said annular region; and a central boss on said valve member occupying a position in said throat when said valve member is closed and occupying a position within said central area when said valve member is open, said boss being responsive to fluid flow to urge said valve member into said annular region.

3. A swing-type check valve, comprising: a tubular valve body having an internally enlarged upstream end forming a valve chamber; an inner sleeve having spaced seal rings and a channel therein slidably rotatable and sealingly fitted in said valve body and forming a throat, said sleeve extending into said valve chamber and forming at its extreme end a valve seat, said throat tending to confine high velocity flow of fluid issuing therefrom to the central region of said valve chamber and to establish therearound an annular region of low velocities; externally accessible means screw-threaded in the walls of said body and cooperating with said channel to secure said sleeve in said body, said means and channel permitting circumferential adjustment of said sleeve relative to said body; a valve member for said valve seat; a hinge means at one side of said valve member and inner sleeve within said annular region for permitting movement of said valve member between a position closing said throat and an open position within said annular region; and a central boss on said valve member occupying a position in said throat when said valve member is closed and occupying a position within said central area when said valve member is open, said boss being responsive to fluid flow to urge said valve member into said annular region.

4. A swing-type check valve, comprising: a tubular valve body having an internally enlarged upstream end forming a valve chamber; an inner sleeve having spaced seal rings and a channel therein slidably rotatable and sealingly fitted in said valve body and forming a throat, said sleeve extending into said valve chamber and forming at its extreme end a valve seat, said throat tending to confine high velocity flow of fluid issuing therefrom to the central region of said valve chamber and to establish therearound an annular region of low velocities; externally accessible means screw-threaded in the walls of said body and cooperating with said channel to secure said sleeve in said body, said means and channel permitting circumferential adjustment of said sleeve relative to said body; a pair of longitudinally adjustable hinge brackets mounted on said sleeve at one side thereof; a valve member pivotally connected to said hinge brackets, said valve member being movable between a closed position engaging said seat and an open position within said annular region; and a central boss on said valve member occupying a position in said throat when said valve member is closed and occupying a position within said central area when said valve member is open, said boss being responsive to fluid flow to urge said valve member into said annular region.

References Cited in the file of this patent

UNITED STATES PATENTS

| | | |
|---|---|---|
| 2,282,532 | Shenk | May 12, 1942 |
| 2,482,198 | Melichar | Sept. 20, 1949 |
| 2,694,358 | Taylor | Nov. 16, 1954 |
| 2,877,790 | Wilhelm | Mar. 17, 1959 |
| 3,066,693 | Taylor | Dec. 4, 1962 |

FOREIGN PATENTS

| | | |
|---|---|---|
| 503,294 | Germany | July 25, 1930 |